United States Patent [19]

Sawada

[11] Patent Number: 4,733,805

[45] Date of Patent: Mar. 29, 1988

[54] HELMET HOLDING DEVICE FOR MOTORCYCLES

[75] Inventor: Takuma Sawada, Tokyo, Japan

[73] Assignee: Honda Giken Kogyo Kabushiki Kaisha, Tokyo, Japan

[21] Appl. No.: 922,638

[22] Filed: Oct. 24, 1986

[30] Foreign Application Priority Data

Oct. 25, 1985 [JP] Japan .................................. 60-237669

[51] Int. Cl.⁴ ............................................. B62J 7/00
[52] U.S. Cl. ...................................... 224/39; 224/42; 224/42.42; 280/289 L
[58] Field of Search ............... 224/273, 275, 31, 32 A, 224/30 R, 39, 42, 42.45 R, 42.42; 280/289 L; 70/237, 58, 258

[56] References Cited

U.S. PATENT DOCUMENTS

| | | | |
|---|---|---|---|
| 3,399,855 | 9/1968 | Shirai | 224/39 X |
| 3,756,048 | 9/1973 | Portus | 224/273 X |
| 3,779,597 | 12/1973 | Uchida | 224/42.45 R |
| 3,831,407 | 8/1974 | Coleman | 224/273 X |
| 3,837,545 | 9/1974 | Rogers, Jr. | 224/31 |
| 4,024,738 | 5/1977 | Pi | 224/31 X |
| 4,201,398 | 5/1980 | Meier | 70/258 X |
| 4,438,877 | 3/1984 | Jackson | 224/275 |
| 4,588,114 | 5/1986 | Lebaron et al. | 224/32 A |

FOREIGN PATENT DOCUMENTS

2834967  2/1980  Fed. Rep. of Germany .... 224/30 R
2367651  6/1978  France ............................. 224/273

OTHER PUBLICATIONS

Popular Science, Nov. 1981, Wordless Workshop, p. 121.

Primary Examiner—Henry J. Recla
Assistant Examiner—Robert M. Petrik
Attorney, Agent, or Firm—Lyon & Lyon

[57] ABSTRACT

A helmet holding device for suspending and holding a helmet below a trunk mounted on the rear portion of a frame of a motorcycle. The helmet holding device comprises a stay member mounted on the rear portion of the frame of the motorcycle, a trunk mounted on the stay member and having a bottom plate extended backwardly of the stay member and a helmet holder attached to the portion of the bottom plate extended backwardly of the stay member. A hook member of the helmet holder is vertically movable through a hole formed through the bottom plate and a locking mechanism for locking the hook member is disposed on the upper surface of the bottom plate.

6 Claims, 5 Drawing Figures

HELMET HOLDING DEVICE FOR MOTORCYCLES

BACKGROUND OF THE INVENTION

The field of the present invention generally relates to motorcycles and more particularly a helmet holding device therefor.

Since a driver must wear a helmet when driving a motorcycle, motorcycles are provided with helmet holders for holding a protective helmet when the letter is not in use. In general, the conventional helmet holder comprises a hook for hanging the chin-strap of a helmet. That hook is provided with a lock in order to prevent the helmet from being stolen or from falling off.

The typical helmet holder of the type described is attached to any suitable position of the frame of a motorcycle, but the motorcycle is equipped with a wide variety of auxiliary devices so that the hook and its locking mechanism must be mounted on the frame in such a way that they will not physically interfere with other devices mounted on the motorcycle. Further, it is preferred that the helmet, when held on the motorcycle, avoids becoming wet when it rains. As a result, it is not easy to determine the best position on the frame of the motorcycle to attach the helmet holder. In addition, the freedom in design of the locking mechanism is limited because of limited available space.

SUMMARY OF THE INVENTION

In view of the above, the present invention provides a helmet holding device for a motorcycle mounted on the rear portion of a motorcycle.

Therefore, according to the present invention, the helmet may be suspended in a relatively wide space defined below a trunk mounted on the rear portion of the motorcycle frame without interfering with other devices equipped on the motorcycle. The upper portion of the suspended helmet is covered by the trunk so that the helmet does not become wet when it rains. Further, a locking mechanism is constructed by utilizing the relatively large bottom plate of the trunk so that there is greater freedom in design of the locking mechanism.

Further, according to the present invention, a novel locking mechanism for the helmet holder of the type described above is provided.

Accordingly it is an object of the present invention to provide an improved helmet holding device for a motorcycle.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
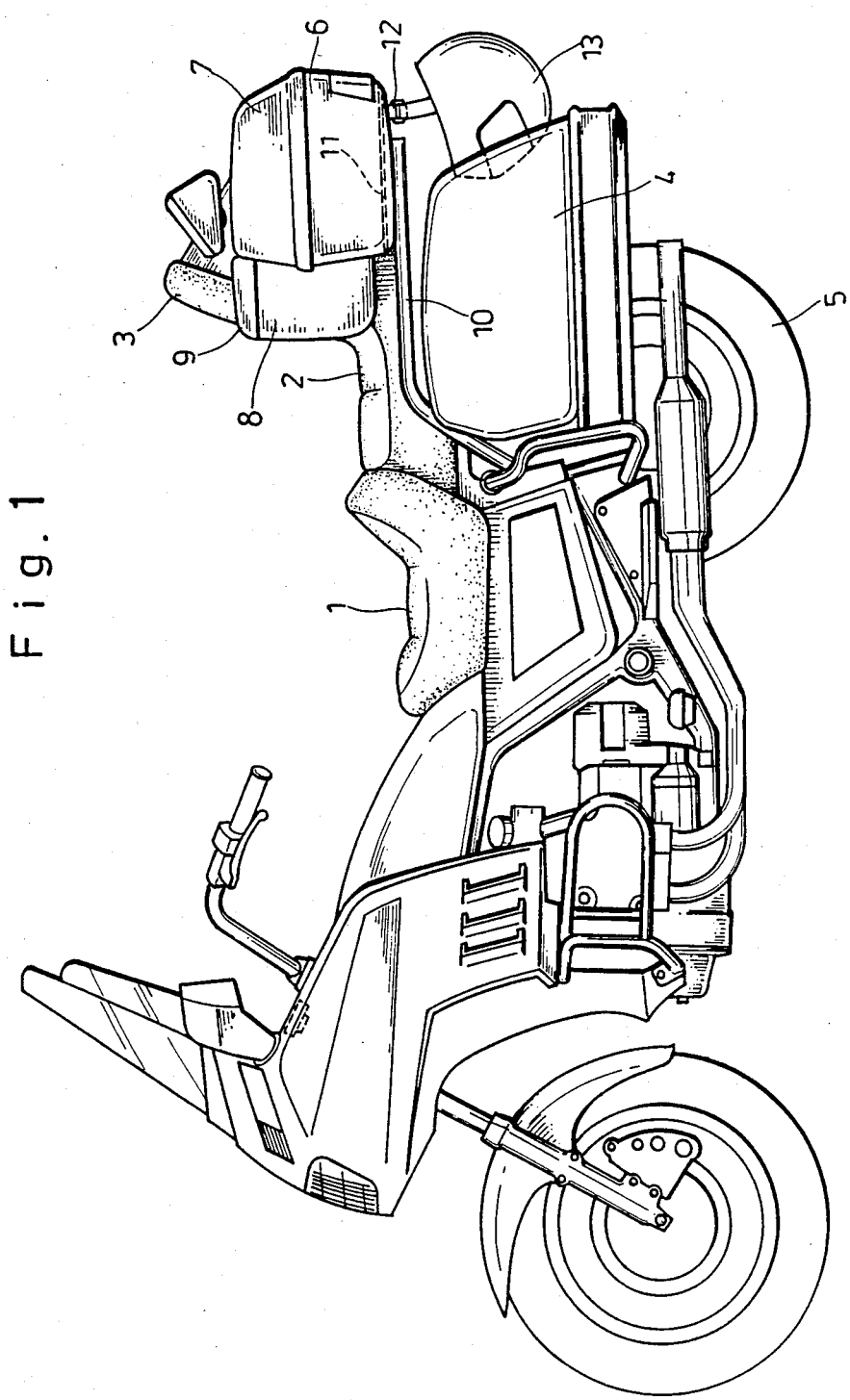
FIG. 1 is a side view of a motorcycle.

The present invention will be now described in detail with reference to the accompanying drawings. FIG. 1 is a side view of a motorcycle to which is applied the present invention. The motorcycle shown is of a two-seater type having a front saddle 1 and a rear saddle 2 with a backrest 3. Side trunks 4 are attached to the frame below the rear saddle 2 in such a way that they partially cover the rear wheel 5. A rear trunk 6 (to be referred simply as "a trunk" hereinafter in this specification) is mounted behind the rear saddle 2. Pockets 8 for storing small articles therein are attached on both front sides of a top cover 7 of the trunk 6. Elbow rests 9 are disposed at the tops of the pockets 8 for a rider riding on the rear saddle 2.

The front half portion of the bottom plate 11 of the trunk 6 is securely attached to the stay member 10 extended rearward of the motorcycle frame and a helmet holder 12 is attached to the rear portion of the bottom plate 11 extended rearward of the stay member 10 and a helmet 113 is suspended from the helmet holder 12. A relatively wide space is defined below the trunk 6 and between the side trunks 4 so that two helmets for two riders may be stored therein. Further, the trunk 6 is disposed above the helmet 13 suspended from the helmet holder 12 so that the helmet 13 avoids getting wet by the rain. Moreover, the side portions of the helmet 13 may be protected by the side trunks 4 on both sides of the frame. Furthermore, the rear portion of the bottom plate 11 of the trunk 6 is relatively widely extended in the lateral direction so that a locking mechanism for the helmet holder 12 can be installed by utilizing the laterally extended portion of the bottom plate 22 without a limitation of an installation space. As a consequence, an excellent locking mechanism may be accommodated which is conveniently operable.

Figure 2:
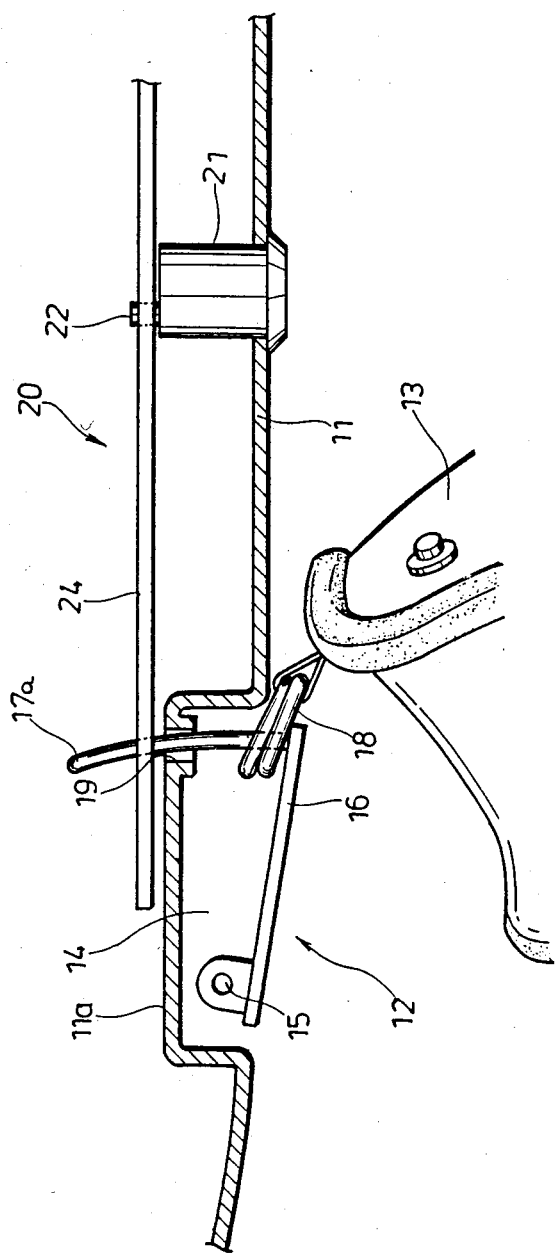
FIG. 2 is a fragmentary sectional view of the bottom plate of a trunk of a motorcycle.

FIG. 2 is a sectional view of the bottom plate cut in the width direction of the motorcycle frame and viewed from the back of the motorcycle, but it illustrates only the left portion of the bottom plate 11. An upwardly extended recess 14 is defined along the side of the bottom plate 11 and the helmet holder 12 is pivotably carried by a pivot shaft 15 extended between the front and rear walls of the recess 14. The helmet holder 12 comprises a swinging member 16 pivoted to the pivot shaft 15 and a hook member 17a extended up from the leading end of the swinging member 16 and adapted to engage with a D ring 18 of the chin-strap of the helmet 13, whereby the helmet 13 is suspended from the helmet holder 12. The hook member 17a is extended through a hole 19 formed through the top wall 11a of the recess 14 and is locked by a locking mechanism generally indicated by the reference numeral 20 with a key cylinder 21 securely attached at the midpoint between the lateral sides of the bottom plate 11.

Figure 3:
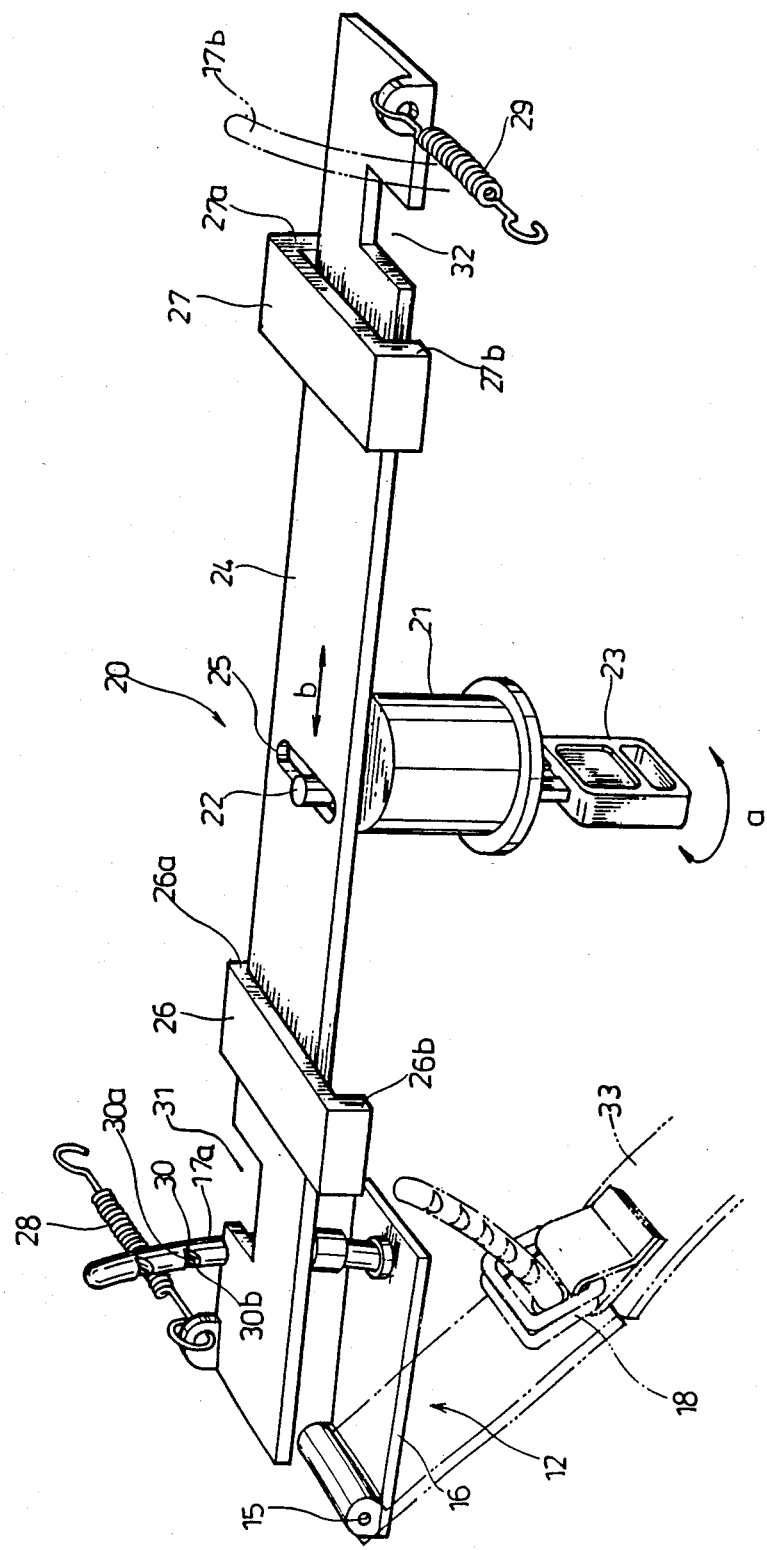
FIG. 3 is a perspective view of a helmet holder locking mechanism.

FIG. 3 is a perspective view illustrating in detail the locking mechanism 20. A pin 22, which is extended upwardly from the top end of the key cylinder 21, is operatively connected to an interior actuating mechanism such that when a key 23 is inserted into the key cylinder 22 and rotated in either direction as indicated by the double-pointed arrow a, the pin 22 is caused to rotate in the same direction. The pin 22 is fitted in a longitudinally extended groove 25 formed at the center portion of a laterally elongated locking plate 24. Therefore when the pin 22 is rotated in the manner described above, the locking plate 24 is displaced to the left or right direction as indicated by the double-pointed arrow b depending upon the direction of rotation of the key 23. Guide members 26 and 27 are securely attached to the bottom plate 11 on both sides of the key cylinder 21 and are adapted to partially embrace the locking plate 24 in such a way that the locking plate 24 is maintained horizontally and directed in the lateral direction. Coiled springs 28 and 29 are attached to the left and right ends of the locking plate 24 in such a way that the ends of the locking plate 24 are pulled in the opposite directions. As a result, the front edge of the locking plate 24 is drawn into contact with the front leg portion 26a of the guide member 26 while the rear edge of the locking plate 24 is drawn into contact with the rear leg portion 27b of the right guide member 27 so that a space or a gap is defined between the rear edge of the locking plate 24 and the rear leg portion 26b of the left guide member 26 and between the front edge of the locking plate 24 and the front leg portion 27a of the right guide member 27.

In FIG. 3, the helmet holder 12 which is locked is indicated by the solid lines. As described above with reference to FIG. 2, the helmet holder 12 comprises the swinging member 16 and the hook member 17a and a notch 30 is cut into the rear surface of the hook member 17a. The notch 30 has a first surface 30a which is perpendicular to the axis of the hook member 17a and a second surface 30b which is inclined down at an angle from the joint between the first and second surfaces 30a and 30b. When the upper surface of the locking plate 24 is engaged with the first surface 30a of the notch 30, the helmet holder 12 is locked. The locking plate 24 is pressed against the hook member 17a under the force of the coiled spring 28 so that engagement between them is prevented from being released unintentionally. Another helmet holder 12 which is substantially similar in construction to the helmet holder 12 described above is disposed also on the right side of the locking plate 24 and only its hook member is shown as indicated by the phantom lines.

The front edge on the left end side of the locking plate 24 is formed with a recess 31 adjacent to the left hook member 17a and a similar recess 32 is formed at the rear edge of the locking plate 24 on the right end side thereof adjacent to right hook member 17b.

As indicated in FIG. 3, the left and right hook members 17a and 17b are locked when the locking plate 24 is at its neutral position. Then, when the key 23 is turned rotating the pin 22 such that the locking plate 24 is shifted to the left, the left recess 31 reaches the position of the left hook member 17a so that the locking plate 24 is disengaged from the notch 30 of the left hook member 17a. As a result, the helmet holder 12 swings down about the pivot shaft 15 and is therefore brought to the unlocked or released position at which the leading end of the hook member 17a is located below the bottom plate 11 as indicated by the phantom lines. In this case, however, the right helmet holder (with only right hook member 17b shown) remains in the locked position because the right recess 32 is located at the position on the left side of the right hook member 17b. Under the above-described condition, the left hook member 17a of the left helmet holder 12 is fitted into, for instance, the D ring 18 of the chin-strap 33 and then the helmet holder 12 is pushed up by a rider. In this case, the locking plate 24 is returned to its initial or neutral position as shown in FIG. 3, but the left hook member 17a is formed to move upwardly while making contact with the front edge of the locking plate 24 and pushing it backwardly against the force of the coiled spring 28. When the rider releases the helmet holder 12 when the notch 30 of the left hook member 17a becomes in line with the locking plate 24, the surface 30a of the notch 30 is drawn into engagement with the upper surface of the locking plate 24, whereby the helmet holder 12 is locked. When the locking plate 24 is pushed backwardly by the left hook member 17a in the manner described above, it swings about the leg portion 27b of the right guide member 27 so that the displacement of the right end of the locking plate 24 is very small and consequently the right hook member 24 positively remains in engagement with the locking plate 24. So far the locking and unlocking operations of the left helmet holder 12 have been described, but same is true for the operations of the right helmet holder. In order words, according to the first embodiment of the present invention, one of the right and left helmet holders 12 can be freely locked or unlocked independently of the other helmet holder 12.

When the helmet holder 12 is not used, the swinging plate 16 is brought to the locked position which is coplanar with the bottom plate 11 (see FIG. 2) and is not extended beyond the bottom plate 11 so that the helmet holder 12 has a good outer appearance and is positively prevented from engaging or interfering with any other object.

Figure 4:
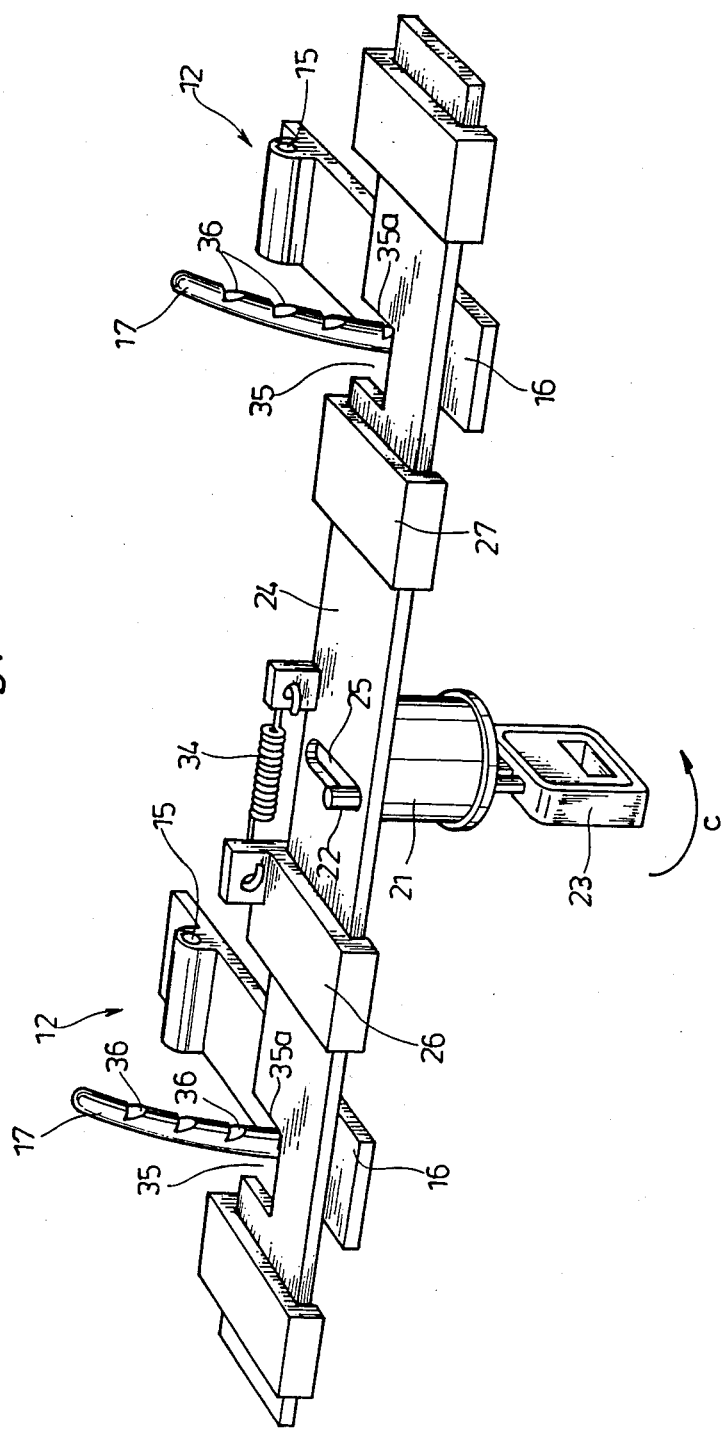
FIGS. 4 and 5 are perspective views of modified helmet holder locking mechanisms, respectively, in accordance with the present invention.

FIG. 4 shows a modification of the first embodiment shown in FIG. 1 and same reference numerals are used to designate similar parts in both FIGS. 3 and 4 so that the component parts already described in detail with reference to FIG. 3 will not be made. In this modification, the guide members 26 and 27 are so designed, constructed and disposed that the locking plate 24 are permitted only to move in the right and left directions, but are not permitted to swing forwardly or backwardly. Therefore the coiled springs 28 and 29 used in the first embodiment shown in FIG. 3 can be eliminated, but a coiled spring 34 is loaded between the locking plate 24 and the left guide member 26 so that the locking plate 24 is normally biased in the left direction and is maintained in the locked position as shown in FIG. 4 by the pin 22 fitted into the elongated slot 25 of the locking plate 24. The front edge of the locking plate 24 is formed with recesses 35 adjacent to the ends, respectively, thereof and the left and right hook members 17a and b are extended through these recesses 35, respectively. The right surface of each of the right and left hook members 17a and b are formed with a plurality of notches 36 which are substantially similar in construction to the notch 30 described above with reference to FIG. 3. When one of the notches 36 engage with the right edge 35a of the recess 35, the helmet holder 12 is locked. To unlock the helmet holder 12, the key 23 is turned in the direction indicated by the arrow c so that the pin 22 causes the locking plate 24 to shift itself to the right. When the key 23 is released, the locking plate 24 is returned to its initial position indicated in FIG. 4 under the force of the coiled spring 34. The step for bringing the helmet holder 12 to the locked position from the unlocked position is substantially similar to that described above with reference to FIG. 3. That is, it suffices to push the helmet holder 12. In this modification, both the right and left helmet holders 12, 12 are simultaneously locked or unlocked.

Figure 5:
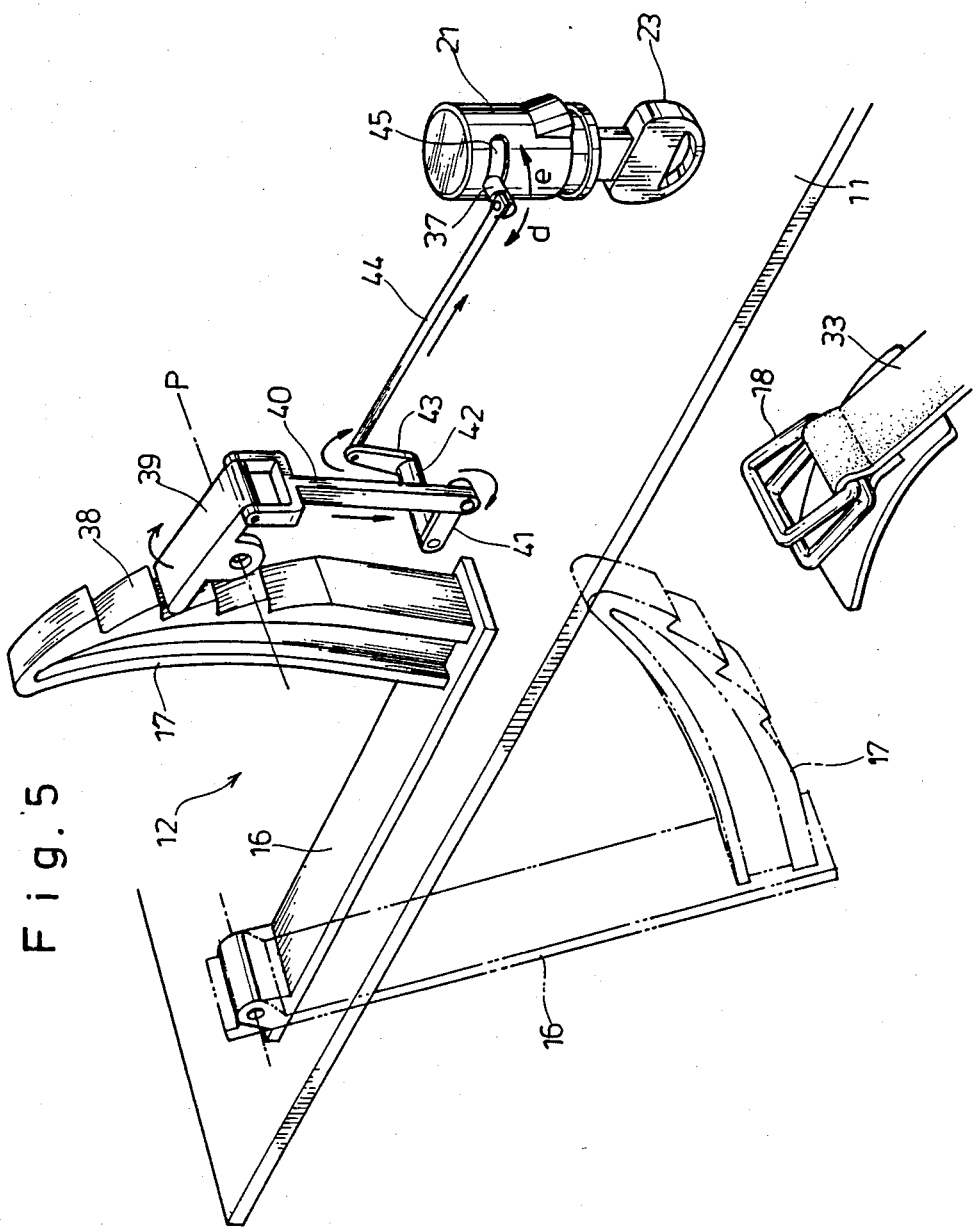

FIG. 5 shows a further modification of the present invention in which a helmet holder 12 includes a the swinging member 16 and a hook member 17 which are pivoted to the bottom plate 11. The helmet hodler 12 is maintained in the locked position indicated by the solid lines after the hook member 17 receives the chin-strap or the D ring 18 in unlocked or released position indicated by phantom lines. As in the case of the embodiment and its modification described hereinbefore, the key cylinder 21 is securely fitted to the bottom plate 11 and when the key 23 is inserted into the key cylinder 21 and is turned, a pin 37 is rotated. In this modification or embodiment, the hook member 17 is formed with a plurality of ratchet teeth 38 for engagement with a ratchet pawl 39 which is pivoted with a pin to the bottom plate 11 for swinging movement about the axis p. The other end of the ratchet pawl 39 is connected through a connecting rod 40 and a crank arm 41 to a crankshaft 42 pivotably mounted on the bottom plate 11. The crank shaft 42 is also connected through a second crank arm 43 and a connecting rod 44 to the pin 37. The pin 37 is normally biased in the direction indicated by the arrow d under the force of a bias spring (not shown) and drawn into engagement with the left end of an elongated slot 45 formed through the cylindrical surface of the key cylinder 21. As a result, the force which is exerted by one of the ratchet teeth 38 to the leading or engaging end of the ratchet pawl 39 in the downward direction is received by the left end of the elongated slot 45 through the above-described component parts 40-44 and the pin 37, whereby the helmet holder 12 is locked by the ratchet pawl 39. When the key 23 is turned so that the pin 37 is rotated in the direction indicated by the arrow e the component parts 39-44 are caused to be displaced in the directions indicated by the arrows, respectively, so that the ratchet pawl 39 is disengaged from the ratchet tooth 38, whereby the helmet holder 12 is unlocked or released. Since the pin 37 is biased in the direction d under the force of the bias spring (not shown) as described above, when the helmet holder 12 is pushed from the unlocked or released position indicated by the two-dot broken lines to the locked position indicated by the solid lines, the leading or engaging end of the ratchet pawl 39 is caused to swing along the ratchet teeth 38, permitting the upward movement of the helmet holder 12. The ratchet pawl 39 engages with a suitable ratchet tooth 38, whereby the helmet holder 12 is locked and prevented from moving downwardly.

So far the left helmet holder 12 and its associated locking mechanism have been described with reference to FIG. 5, but it is apparent to those skilled in the art that the right helmet holder and its associated locking mechanisms which are substantially similar to those described above may be disposed on the right side of the key cylinder 21 and operatively coupled thereto.

What is claimed is:

1. A helmet holding device for a motorcycle including a stay member mounted on the rear portion of a frame of the motorcycle,
   a trunk which is mounted on the stay member and has a bottom plate extending rearwardly of said stay member, and
   a helmet holder attached to the portion of said bottom plate extending rearwardly of said stay member for suspending and holding a helmet, said helmet holder comprising a swinging member swingably pivoted to the undersurface of said bottom plate and a hook member which extends upwardly from the free end of said swinging member for protruding through a hole formed through said bottom plate, said hook member having at least one locking notch.

2. A helmet holding device as set forth in claim 1 further comprising a locking plate which is positioned over the top surface of said bottom plate and a key cylinder securely mounted on said bottom plate, said locking plate capable of being displaced in a right or left direction by means of a pin extended from said key cylinder for selectively engaging with said locking notch of said hook member.

3. A helmet holding device as set forth in claim 2 further comprising a guide means for allowing said locking plate to be displaced substantially only in the left or right direction.

4. A helmet holding device as set forth in claim 3 further comprising a spring means for normally causing the rotation about said pin of said locking plate and guide means for restricting the rotation about said pin of said locking plate beyond a predetermined angle of rotation.

5. A helmet holding device as set forth in claim 2 further comprising a means for normally biasing said locking plate toward one direction.

6. A helmet holding device as set forth in claim 1 further comprising a ratchet pawl for releasably engaging with one of a plurality of locking notches of said hook member.

* * * * *